Patented Sept. 16, 1924.

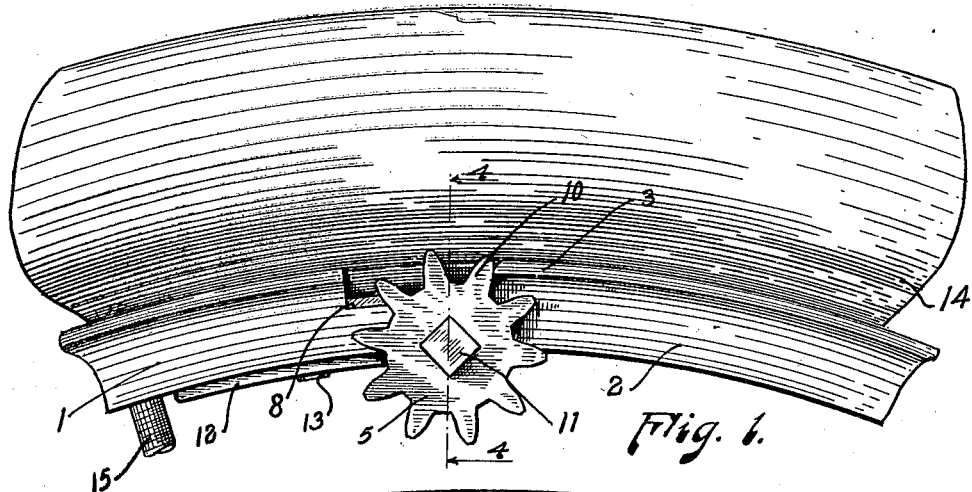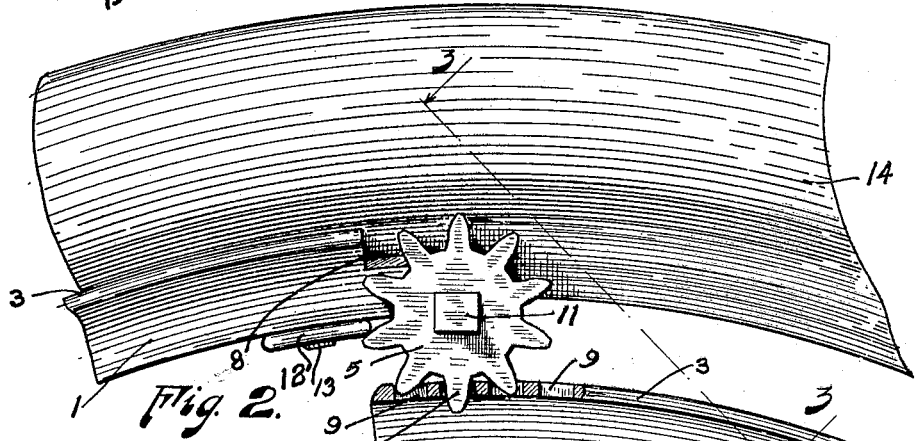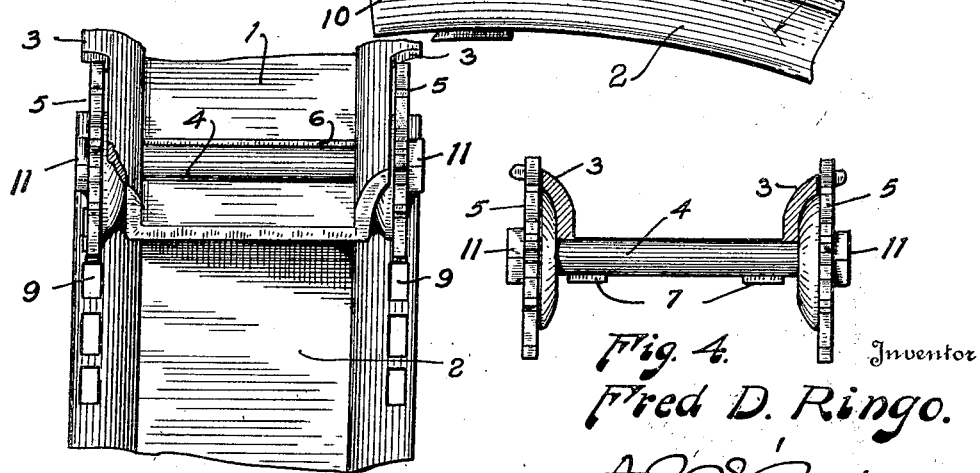

1,508,723

UNITED STATES PATENT OFFICE.

FRED D. RINGO, OF LIMON, COLORADO, ASSIGNOR, BY DIRECT AND MESNE ASSIGNMENTS, OF ONE-THIRD TO MILTON N. THOMPSON, OF LIMON, COLORADO, AND ONE-THIRD TO FRANCIS BLAKEMAN, JR., OF EADS, COLORADO.

DEMOUNTABLE RIM WITH CONTRACTING AND EXPANDING MEANS.

Application filed February 19, 1923. Serial No. 619,897.

*To all whom it may concern:*

Be it known that I, FRED D. RINGO, a citizen of the United States, residing at Limon, county of Lincoln, and State of Colorado, have invented certain new and useful Improvements in Demountable Rims with Contracting and Expanding Means; and I do declare the following to be a full, clear, and exact description of the invention such as will enable others skilled in the art to which it appertains to make and use the same, reference being had to the accompanying drawings, and to the characters of reference marked thereon, which form a part of this specification.

This invention relates to demountable rims of the kind employed in connection with automobiles.

It is customary for each automobile to carry at least one tire fully inflated and mounted on a steel rim so that it can be substituted for a defective tire with a small expenditure of time and labor.

When a tire has been punctured or blown out, it becomes necessary to remove the casing from the rim and to repair the damaged part or substitute a different casing or inner tube, as the case might be.

In order to remove and replace a tire on a demountable rim, it is necessary to contract the rim in order to remove the casing or to apply a new one thereto. When the new casing is in place it is frequently necessary to expand the rim in order to get the ends of the rim to abut each other.

I am aware that many different rim tools have been invented for the purpose of contracting and expanding demountable rims, but all of these tools with which I am familiar are separate from the rim and must be attached thereto and removed therefrom at each operation.

It is the object of this invention to produce an improved rim that shall have embodied in the construction thereof a means by which it can be contracted and expanded so as to obviate the necessity of carrying a separate tool for the purpose.

In order to more clearly describe my invention, I shall have reference to the accompanying drawing, in which:

Fig. 1 is a side elevation of a fragment of a rim showing the same in operative position and showing the contracting and expanding means in place thereon.

Fig. 2 is a view similar to that in Fig. 1 showing the rim contracted.

Fig. 3 is a section taken on line 3—3, Fig. 2; and

Fig. 4 is a section taken on line 4—4, Fig. 1.

The same reference characters will be used to designate the same parts throughout the several views.

Numeral 1 represents one end of a circular demountable rim and 2 represents the other end. Ends 1 and 2 abut each other in the usual manner. The rim is of the usual cross-section and has outwardly curved flanges 3. Attached to the bottom of the rim near end 1 is a shaft 4 to each end of which is secured a cog-wheel 5. The shaft is journaled in a transverse slot 6 in the bottom of the rim and is held in place by straps 7 whose ends may be riveted or welded to the bottom of the rim. The flanges 3 of end 1 are cut away as indicated by numeral 8 so as to permit the cog-wheels to extend above the same. The flanges 3 of end 2 are perforated, as indicated by numeral 9. When the rim is in operative position with the ends abutting, as shown in Fig. 1, one tooth 10 extends upwardly beyond the flange 3 a sufficient distance to enable it to engage the flange whenever the wheel is rotated in a clockwise direction.

The outside of each wheel 5 has a non-circular projection 11 which may be square, as shown, or hexagonal. In either case it can be engaged by a wrench by means of which the shaft 4 and wheels 5 are rotated. With the parts as shown in Fig. 1, let us assume that the wheels 5 are rotated in a clockwise direction, the tooth 10 will engage the flange 3 and bend the end 2 inwardly. The tooth will finally enter the end hole 9 and the parts will ultimately assume the position shown in Figs. 2 and 3. As the rim is stiff and resilient it will, of course, try to move back to its normal position and before the wrench is removed from the lug 11, the wheel 5 must be locked. I have shown one form of locking means which consists of a piece of flat steel 12 that is pivoted to the rim by means of a rivet 13. This member 10 may be rotated about its pivot into the path of the teeth somewhat as shown in Fig. 2.

When the rim has been contracted and locked in contracted position by means of the member 12, the tire casing 14 may be removed and repaired or a new one applied. When the new casing has been put into place, the wrench is applied to lug 11 and the locking member 12 moved into inoperative position, after which the wheels 5 are permitted to rotate counter-clockwise and the rim expanded by imparting to the lug 11 a force tending to turn the wheels counter-clockwise.

It will be seen from the above that I have produced a rim which has applied thereto a mechanism, by means of which it can be readily contracted and expanded. My mechanism is very simple and will add but little to the cost of manufacture, while, at the same time, it will assure the owner that he will always be able to remove and replace his tire casing, as the only tool required is a wrench.

The valve stem 15 should be placed near to the end of the rim so that the rim can be readily applied to the wheel.

Having now described the invention, what I claim as new is:

A demountable rim comprising a substantially circular split ring whose ends normally abut each other, said rim having a substantially channel-shaped cross section with outwardly curved flanges; a shaft journaled in the bottom of the rim near one end; a cog-wheel on each end of the shaft, the flanges being cut away to provide space for the wheels, the other end of the rim having its flanges provided with perforations to cooperate with the cogs on the wheels and means to lock the wheels against rotation.

In testimony whereof I affix my signature.

FRED D. RINGO.